UNITED STATES PATENT OFFICE.

CHRISTOPHER S. BENJAMIN, OF KALAMAZOO, MICHIGAN.

IMPROVED COMPOSITION FOR FILLING THE PORES OF WOOD.

Specification forming part of Letters Patent No. 58,203, dated September 25, 1866.

*To all whom it may concern:*

Be it known that I, CHRISTOPHER S. BENJAMIN, of the village of Kalamazoo, in the county of Kalamazoo and State of Michigan, have invented a new and Improved Mode of Filling the Pores of Wood Preparatory to Varnishing the Same; and I do hereby declare that the following is a full and exact description of the composition used for that purpose.

First, I take one pound of fused gum-copal and one quart of the spirits of turpentine and mix them together, and let them stand until the copal is completely dissolved, forming the first compound; second, I then take one gallon of alcohol, and two pounds of shellac, and two pounds of resin, and mix them together until the shellac and resin are completely dissolved, forming the second compound; third, I then mix the first compound with the second compound, and keep warm for six hours, forming the third compound; fourth, I then add to the third compound one-fourth of a pound of beeswax, and dissolve the same over a slow fire, forming the fourth compound; fifth, I then add to the fourth compound one gill of Japan driers, forming the fifth compound, and the composition for which a patent is asked.

When I wish to use this composition to fill the pores of light wood I thicken it with starch, or any other substance which may be used for that purpose, to the consistency of thick paint. When I wish to fill the pores of dark wood I thicken the composition with starch and burnt umber, or any other substance which will produce the required color.

If the compound is too hard, I add linseed-oil; if the composition is too soft, I add more of the first and second compounds until the required consistency is obtained.

In using this compound I apply it to the wood to be varnished with a stiff brush, rubbing the composition well into the pores of the wood; then allow it to remain until it has the appearance of being dry, which will require from one to three hours, after which I remove from the surface of the wood all the composition possible, leaving none of the composition on the wood except what may be in the pores, which will be completely filled by using this composition in the manner above described.

What I claim as my invention, and desire to secure by Letters Patent, is—

The composition for filling the pores of wood preparatory to varnishing, substantially as herein described.

C. S. BENJAMIN.

Witnesses:
GEO. R. HAYNES,
WM. F. BAILEY.